(12) United States Patent
Popa et al.

(10) Patent No.: US 8,804,724 B2
(45) Date of Patent: Aug. 12, 2014

(54) EFFICIENT MULTICAST IN A SMART GRID

(71) Applicant: Itron, Inc., Liberty Lake, WA (US)

(72) Inventors: Daniel Popa, Paris (FR); Jorjeta Gueorguieva Jetcheva, San Jose, CA (US); Mehdi Mani, Paris (FR); Bastien Mainaud, Ris-Orangis (FR); Viet-Hung Nguyen, Paris (FR)

(73) Assignee: Itron, Inc., Liberty Lake, WA (US)

( * ) Notice: Subject to any disclaimer, the term of this patent is extended or adjusted under 35 U.S.C. 154(b) by 0 days.

(21) Appl. No.: 13/648,039

(22) Filed: Oct. 9, 2012

(65) Prior Publication Data
US 2013/0315057 A1 Nov. 28, 2013

(30) Foreign Application Priority Data
May 28, 2012 (EP) .................................... 12004107

(51) Int. Cl.
*H04L 12/56* (2006.01)

(52) U.S. Cl.
USPC .......................................... 370/390; 370/400

(58) Field of Classification Search
None
See application file for complete search history.

(56) References Cited

U.S. PATENT DOCUMENTS

| | | | |
|---|---|---|---|
| 6,781,999 B2 * | 8/2004 | Eyuboglu et al. | 370/399 |
| 7,788,368 B1 * | 8/2010 | Scano et al. | 709/224 |
| 7,924,761 B1 * | 4/2011 | Stevens | 370/315 |
| 8,121,124 B2 * | 2/2012 | Baykal et al. | 370/390 |
| 2002/0048275 A1 * | 4/2002 | Atwater et al. | 370/409 |
| 2003/0099198 A1 | 5/2003 | Kiremidjian et al. | |
| 2003/0152098 A1 | 8/2003 | Zhu | |
| 2004/0184471 A1 * | 9/2004 | Chuah et al. | 370/420 |
| 2008/0089390 A1 | 4/2008 | Picard | |
| 2008/0186913 A1 * | 8/2008 | Ahn et al. | 370/329 |
| 2009/0067426 A1 | 3/2009 | Ko | |
| 2009/0161594 A1 | 6/2009 | Zhu et al. | |
| 2009/0303902 A1 | 12/2009 | Liu et al. | |
| 2010/0061368 A1 | 3/2010 | Garofalo | |
| 2010/0150048 A1 | 6/2010 | Tsai et al. | |
| 2012/0102188 A1 | 4/2012 | Shah et al. | |
| 2012/0188934 A1 * | 7/2012 | Liu et al. | 370/312 |

FOREIGN PATENT DOCUMENTS

EP    1589706    10/2005

OTHER PUBLICATIONS

The Extended European Search Report mailed Mar. 8, 2013 for European patent application No. 12004107.4, 6 pages.

(Continued)

*Primary Examiner* — Hassan Kizou
*Assistant Examiner* — Roberta A Shand
(74) *Attorney, Agent, or Firm* — Lee & Hayes, PLLC

(57) ABSTRACT

In a wireless and/or power line communication (PLC) network environment, techniques for multicast of data and management of multicast groups assist in regulating bandwidth consumption and provision of desired multicast data. Nodes indicate interest in multicast groups by transmission of reports upstream. Report transmission may be suppressed to balance bandwidth with need for multicast data. Multicast data packets may be retransmitted downstream to fulfill requests indicated by the reports at a rate and/or frequency based on multicast packet duplication or redundancy. Information, such as broken links or "leave" packets, may indicate that one or more downstream nodes should be removed from a forwarding state. However such removal may impact other nodes. A query may be transmitted downstream, to determine if retransmission/forwarding of multicast retransmissions should continue. Query transmission may be based on a balance between query bandwidth consumption and the needs of downstream nodes.

20 Claims, 5 Drawing Sheets

(56) References Cited

OTHER PUBLICATIONS

The PCT Search Report mailed Feb. 25, 2013 for PCT application No. PCT/US12/59381, 9 pages.
Freaklabs—Open Source Wireless, IEEE 802.15.4 in the context of Zigbee—Part 2, Dec. 14, 2008, 8 pages.
Wireless Medium Access Control, IEEE 802.15.4, Speaker Chun-Yi Chen, Sep. 7, 2007, 40 pages.
The Partial European Search Report mailed Oct. 31, 2012 for European patent application No. 12004107.4, 6 pages.
Lee, et al., "Reliable Data Transfer using Overhearing for Implicit ACK", ICCAS-SICE, Aug. 18, 2009, IEEE, Piscataway, NJ, USA, pp. 1976-1979.
Wu, et al., "Overhearing-aided Data Caching in Wireless Ad Hoc Networks", 29th IEEE International Conference on Distributed Computing Systems Workshops, Jun. 22, 2009, Piscataway, NY, USA, pp. 137-144.

\* cited by examiner

EFFICIENT MULTICAST IN A SMART GRID

RELATED APPLICATIONS

This patent application claims foreign priority to European patent application serial no. 12004107.4, titled "Efficient Multicast in a Smart Grid," filed on 28 May 2012, commonly assigned herewith, and hereby incorporated by reference.

BACKGROUND

A plurality of nodes within a mesh network may be configured for multicast data forwarding. A multicast transmission by a node may be received by multiple nodes. Because the physical size of the network may exceed the transmission range for a given technology, the multicast packet(s) may require retransmission or multi-hop forwarding to more distant nodes.

However, while multicast data forwarding may efficiently transfer information, a number of potential inefficiencies may degrade performance. A first potential problem may result when not all nodes in the network require the same multicast information. Reports sent by nodes upstream may be used to indicate interest in joining a particular multicast group. While this obviates the need to transmit all multicast information to all nodes, inefficiencies may result from over- and under-transmission of reports. A second potential problem involves a frequency of forwarding of multicast data packets. Packets forwarded to downstream nodes with too high a frequency wastes bandwidth, while packets forwarded with too low a frequency may result in failure of nodes to receive desired data in required time. A third potential problem involves nodes leaving multicast forwarding tree because of "broken" communication links or links that have a poor transmission quality. Continued multicast transmission to such nodes wastes bandwidth, but efforts to correct the problem may also introduce inefficiencies. Accordingly, while multicast data forwarding potentially provides an efficient means of communication, a number of issues can introduce inefficiencies.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts, and not to indicate required and/or necessary elements.

DETAILED DESCRIPTION

Overview

Figure 1:
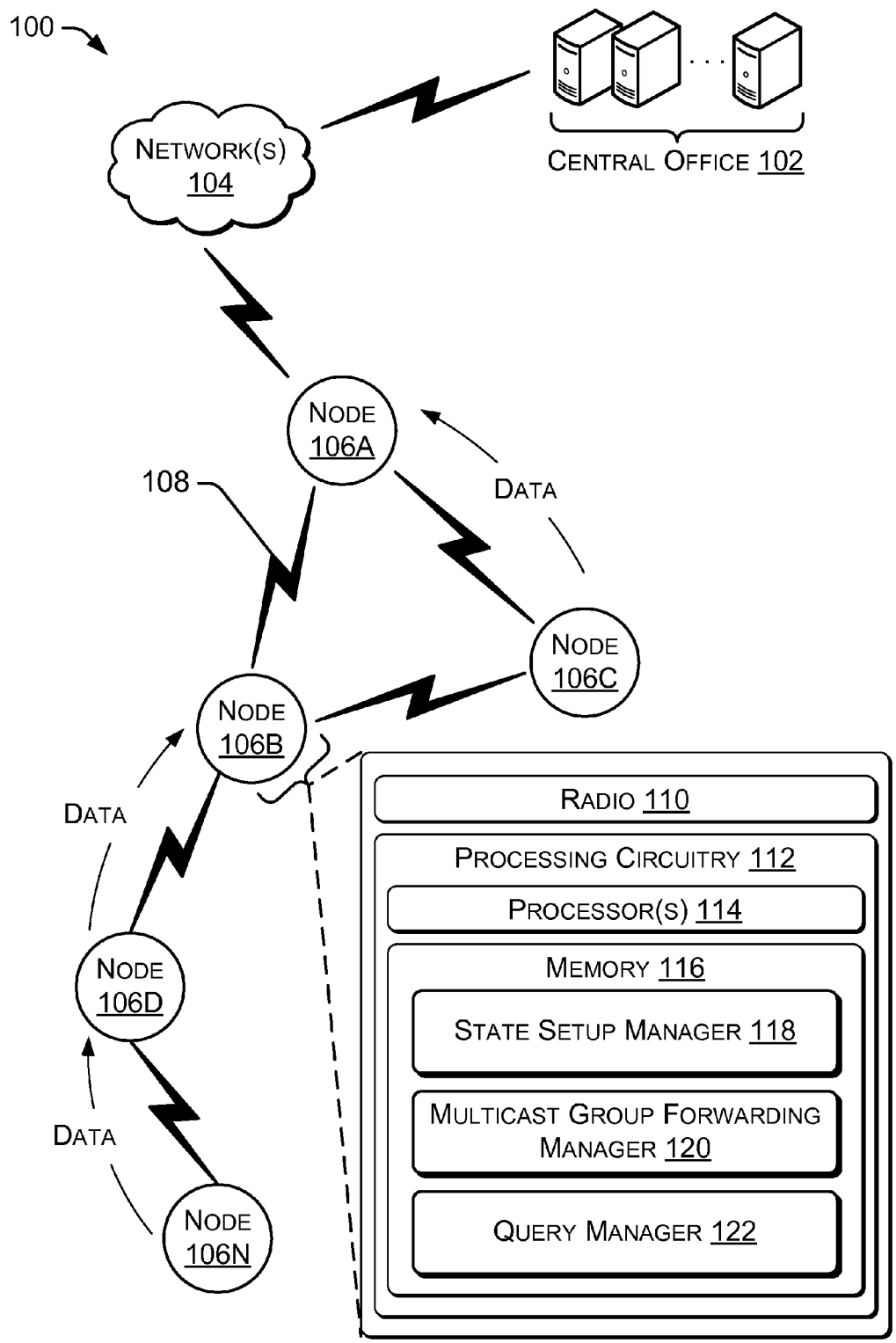
FIG. 1 is a diagram showing an example network having a plurality of nodes, some detail of one example node, a connection to a further network such as the Internet, and a central office.

Multicast data forwarding techniques may provide data to a plurality of nodes within a network. The network may be wireless (e.g., radio frequency (RF)) and/or wired (e.g., power line communication (PLC)). However, not all nodes in the network may require the same data, and therefore may not be part of the same multicast group(s). While upstream transmission of reports specifying particular nodes that desire membership in particular multicast data groups may prevent wasting bandwidth to multicast data packets to nodes that do not need the packets, inefficiencies may result from over- and under-transmission of reports to upstream multicast forwarders. Additionally, while in some instances multicast transmission may efficiently broadcast information to multiple nodes simultaneously, inefficiencies may result from retransmission of multicast data packets with too high a frequency. The retransmission of multicast packets by multicast forwarders is required to increase the reliability of delivering multicast packets. Conversely, ineffectiveness may result from retransmission of multicast data packets at too low a frequency. And finally, while queries to downstream nodes may reduce multicast of unneeded information, excessive transmission of queries may introduce inefficiencies.

The techniques described herein may be adapted to a variety of multicast network environments, such as, for example, advanced metering infrastructure (AMI) networks. Such networks may include a number of utility meters (e.g., gas, water or electric meters, etc.), and may be organized into an autonomous routing area (ARA) headed by a "root." The root can be any device that has enough processing power and memory resources to accommodate the required functionalities of a routing tree root.

By way of a first example, and not as a limitation, management of upstream report transmission by a node is described. In the example, a node may periodically and/or occasionally transmit a report listing multicast groups for which membership is desired. The reports may be periodically modified and retransmitted until no data, associated with the multicast data group(s), are desired by applications on the node or by nodes downstream of the node. Moreover, transmission of the reports by a node may be partially or totally suppressed to cut down on network traffic. The suppression may be according to a local network density, such as by use and maintenance of a "reports robustness" variable involving overheard reports.

As a second example, and again without limitation, multicast data packet forwarding may be managed to provide packets to appropriate nodes, while limiting excessive repetitive forwarding of multicast packets by a node. Excessive duplicative forwarding of multicast data packets may be reduced by use and maintenance of an "overheard robustness" variable or value. Such a variable may related to the number of multicast packets overheard by the node and that are identical to the one pending for retransmission in node's buffers. The number of overheard data packet transmissions may be used in a calculation indicating to what extent the node's own duplicate forwarding of multicast data packet(s) should be performed.

As a third example, and again without limitation, techniques to improve query operation may be used to reduce unnecessary multicast data packet forwarding. It may be desirable to discontinue retransmission of multicast packets to one or more downstream nodes. Such nodes may be receivers and/or forwarders of one or more multicast groups, and may leave a multicast group intentionally or unintentionally. A node may decide to leave a multicast group intentionally, and transmit a "leave" packet upstream to indicate the decision. A node may leave a multicast group unintentionally, such as when separated from parts of the network by a broken link. When a downstream node leaves a multicast group, the upstream node may repeatedly transmit queries downstream, asking for a report of desired multicast groups. The queries allow downstream nodes to either send a report asking to be included in the multicast forwarding group or reaffirm their interest in some multicast groups. The queries may be discontinued when a multicast forwarding state in the node is cancelled, such as due to lack of response to the queries. The frequency and/or total number of such queries may be governed by a query probability. The query probability may be altered over time, such as in response to a number of overheard reports responding to the query. The three examples above may be implemented separately or in combinations with each other and/or other examples.

The discussion herein includes several sections. Each section is intended to be by way of example and is non-limiting in nature. More particularly, this entire description is intended to illustrate components and techniques which may be utilized to perform multicast in an efficient manner, but not components which are necessarily required. The discussion begins with a section entitled "Example Multicast in a Smart Grid," which describes one environment that may implement the techniques described herein. This section depicts and describes a high-level multicast data forwarding architecture, including techniques for upstream report transmission and suppression, multicast data packet forwarding and suppression, and query operation and suppression. A section entitled "Example Methods" discusses aspects of methods operational in devices including processors, memory devices, application specific integrated circuits (ASICs), etc. In particular, the example methods may be applied to any of the techniques discussed herein, including those of the following sections. Next, a section entitled "Example Report Transmission Suppression" illustrates and describes aspects that can be used to regulate a degree to which a node repeatedly forwards a report in an upstream direction, such as a report configured to indicate desired multicast data groups. A further section, entitled "Example Multicast Data Forwarding," illustrates and describes aspects of forwarding multicast data packet(s). Such regulation helps the multicast data packet to arrive at all intended nodes, yet tends to limit over-transmission, which can clog an RF network. A still further section, entitled "Example Query Management" illustrates and describes techniques that may be used to control a frequency and number of queries sent downstream to nodes that may have left multicast groups or which may be been isolated by broken links. Finally, the discussion ends with a brief conclusion.

This brief introduction, including section titles and corresponding summaries, is provided for the reader's convenience and is not intended to describe and/or limit the scope of the claims or any section of this disclosure.

Example Multicast in a Smart Grid

FIG. 1 is a diagram showing example network architecture 100 having a plurality of nodes, some detail of one example node, a connection to a further network such as the Internet, and a central office. The network architecture 100 is provided as a specific instance to illustrate more general concepts of efficient multicast in a smart grid, and not to indicate required and/or necessary elements. In particular, the network architecture 100 will be used to illustrate examples of reports sent upstream to request downstream forwarding of multicast data packets for a specific multicast group and downstream transmission of queries associated with broken links and nodes leaving multicast data groups.

The network architecture 100 may be configured as a smart grid, such as an advanced metering infrastructure (AMI) network including a number of utility meters having wireless and/or PLC communication capabilities. The utility meters may measure consumption of electricity, natural gas, water or other consumable resources. The network architecture 100 may include a plurality of nodes organized as an autonomous routing area (ARA), which may be in communication with a central office 102 through a network 104, such as the Internet. The central office 102 may be implemented by one or more computing devices, such as servers, personal computers, laptop computers, etc. The one or more computing devices may be equipped with one or more processor(s) communicatively coupled to memory. In some examples, the central office 102 includes a centralized meter data management system which performs processing, analysis, storage, and/or management of data received from one or more of the nodes 106. For instance, the central office 102 may process, analyze, store, and/or manage data obtained from a smart utility meter, sensor, control device, router, regulator, server, relay, switch, valve, and/or other nodes. Although the example of FIG. 1 illustrates the central office 102 in a single location, in some examples the central office may be distributed amongst multiple locations and/or may be eliminated entirely (e.g., in the case of a highly decentralized distributed computing platform).

The network(s) 104 may comprise a wireless or a wired network, or a combination thereof, such as the Internet. The network 104 may be a collection of discrete and/or interconnected networks, which may function as a single large network.

The network architecture 100 may include a plurality of nodes 106A, 106B, 106C, 106D, . . . 106N (collectively referred to as nodes 106) communicatively coupled to each other via direct communication radio frequency (RF) or Power Line Communication (PLC) signals, transmissions or links. The nodes may be utility meters. In this example, N represents an example number of nodes in an autonomous routing area (ARA), which may be configured as a wide area network (WAN), metropolitan area network (MAN), local area network (LAN), neighborhood area network (NAN), personal area network (PAN), a combination of the foregoing, or the like.

The node 106A may be considered to be a "root," "root node," "router," "gateway" or similar, and may be configured to connect the ARA to servers within the central office 102 by way of a back-haul network, such as the Internet 104. The nodes 106 may communicate by means of wireless/PLC signals 108, which facilitate both upstream and downstream transfer of data, information, reports, queries and packets, etc, by means of RF/PLC signals.

The node 106B may be representative of each of the nodes 106 and includes a radio 110 (or PLC), configured for communication by means of RF/PLC signals 108, and a processing unit or processing circuitry 112. The radio 110 comprises a radio frequency (RF) transceiver configured to transmit and/or receive RF signals via one or more of a plurality of channels/frequencies. In some implementations, each of the nodes may be configured for wired and/or wireless communication. By way of example and not limitation, wired communications may include power line communications (PCL) or other wired communication network technologies, such as Ethernet. In one example of a wireless implementation, the node 106 may include a single radio 110 configured to send and receive data on multiple different channels, such as a control channel and multiple data channels on each communication link 108. The radio 110 may also be configured to implement a plurality of different modulation techniques, data rates, protocols, signal strengths, and/or power levels. Additionally, the radio may be configured to sequentially tune a plurality of different frequencies, each for a short period of time, in a "frequency hopping" scheme. The network architecture 100 may represent a heterogeneous network of nodes, in that the nodes 106 may include different types of nodes (e.g., smart meters, cellular relays, sensors, etc.), different generations or models of nodes, and/or nodes that otherwise are capable transmitting on different channels and using different modulation techniques, data rates, protocols, signal strengths, and/or power levels.

The processing circuitry 112 may include one or more processors 114 communicatively coupled to memory 116. The processor(s) 114 may execute, and the memory 116 may contain, various software statements, software modules, procedures, managers, algorithms, etc. Such functional blocks may be configured in software and/or firmware, and may be executable by the processor(s) 114. In alternative embodiments, any or all of the processor(s) 114, memory 116 and/or functional blocks or modules 118-122 may be implemented in whole or in part by hardware. Examples of hardware include a microcontroller or other digital device, such as an application specific integrated circuit (ASIC) or other device configured to execute the described functions.

The memory 116, while shown as a monolithic entity, may also be configured as a plurality of similarly and/or differently configured devices, such as read-only memory, writable memory, persistent or non-persistent memory, etc. The memory 116 may be configured to store one or more software and/or firmware modules, which are executable by the processor(s) 114 to implement various functions. The memory 116 may comprise computer-readable media and may take the form of volatile memory, such as random access memory (RAM) and/or non-volatile memory, such as read only memory (ROM) or flash RAM. Computer-readable media includes volatile and non-volatile, removable and non-removable media implemented according to any technology or techniques for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer-readable media does not include transitory media, such as modulated data signals and carrier waves.

In the illustrated example, memory 116 includes a state setup manager 118, a multicast data forwarding manager 120 and a query manager 122, which may be defined by processor-executable instructions executable by actions of the processor(s) 114. Accordingly, the managers 118-122 may be considered to be applications, subroutines, programs, etc. Alternatively, the processor 114, memory 116 and/or managers 118-122 may be defined by operation of one or more hardware devices such as ASICs.

The state setup manager 118 may be configured to create and manage a report including multicast groups desired by applications running on the node 106B. The state setup manager 118 may also receive reports from downstream nodes indicating multicast groups desired by those nodes. The state setup manager 118 may add the groups desired by the downstream nodes into the report it is managing. The report may be sent upstream, so that appropriate upstream nodes respond by forwarding the appropriate multicast groups to the node 106B.

The multicast group forwarding manager 120 may be configured to forward multicast data packets to downstream nodes. The forwarding may be based in part on the report generated by the state setup manager 118 (e.g., on a downstream node), which indicates the multicast group(s) desired by downstream nodes. In one example, the forwarding manager 120 may maintain an "overheard robustness" variable or value, which dictates how many of the same overheard multicast data packet transmissions are enough to cancel out some or all of the node's own duplicate of the heard multicast data packet transmission(s).

The query manager 122 may be configured to detect "leave" packets and broken links, and to manage queries sent downstream as part of an investigation to determine if continued forwarding of multicast data packet transmissions is desirable. When a node voluntarily decides to leave a multicast forwarding group, it sends a "leave packet" upstream, indicating the decision to leave the multicast group. Conversely, a node may be involuntarily removed from a multicast forwarding group by broken link(s) in the network. The query manager 122 may send queries to downstream nodes asking for the downstream nodes to send report(s) indicating desired multicast groups. Such nodes may have been overhearing multicast data, and should now respond to the queries by sending a report indicating desire to join a multicast group. After a threshold period of time and/or a number of repetitions of the query, if downstream nodes fail to respond with at least one report, the node 106B may cancel its multicast forwarding state associated with the multicast group for which the queries were sent, and no answers were received. The forwarding state may be a flag, wherein the setting of the flag—e.g., "yes" or "no"—indicates need, or lack of need, for the node to forward, downstream, multicast data associated with a particular multicast group. Cancellation of the multicast forwarding state stops the node from forwarding multicast packets downstream. In one example, the query manager 122 may configure and maintain a "query probability" variable or value, which can be used as input to determine a number and a frequency of queries sent to downstream nodes. The probability may indicate how likely it is that multicast forwarding should be continued. That is, the initial probability estimates the likelihood that the multicast forwarding state regarding a multicast group will be changed.

Figure 2:
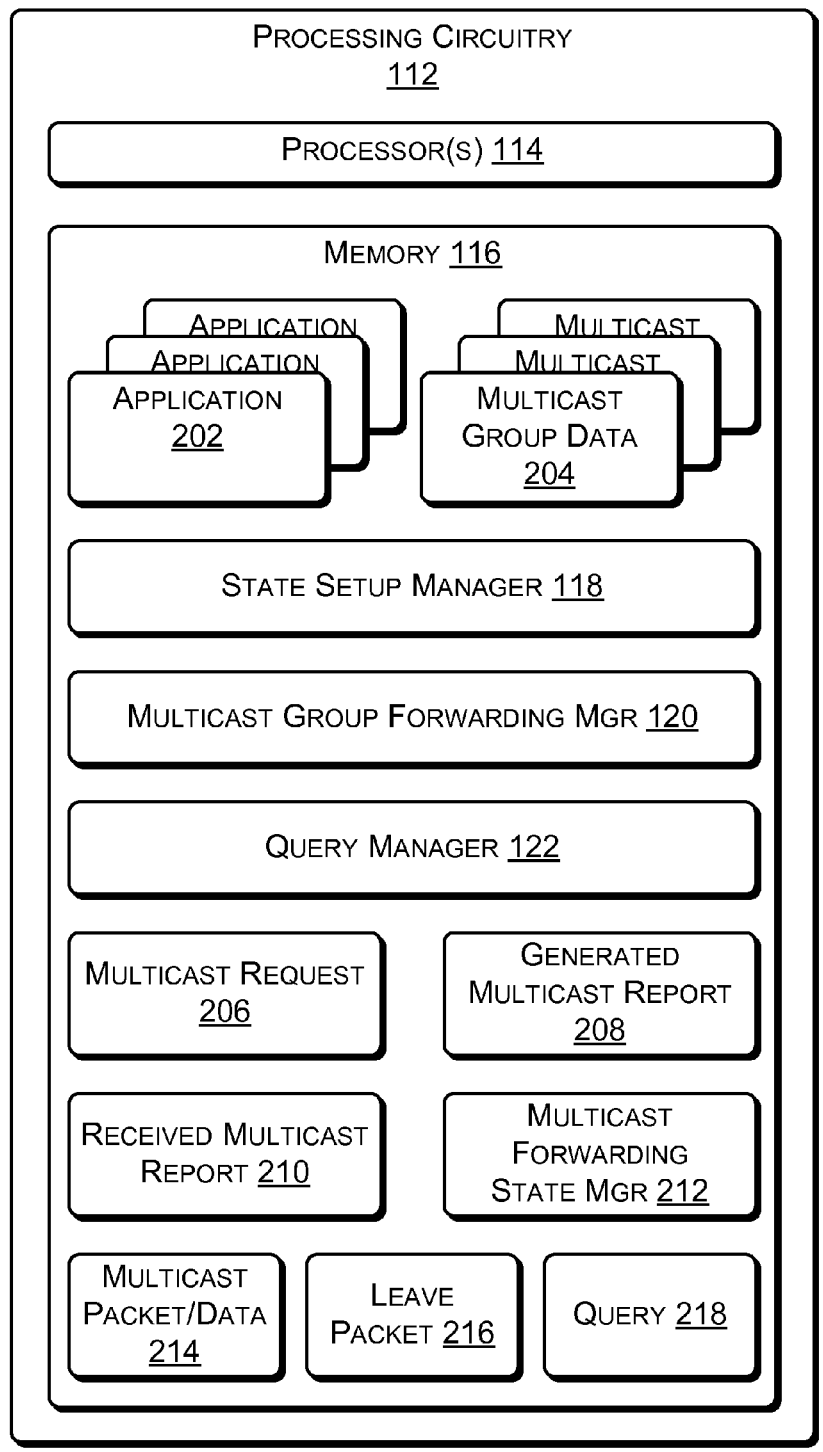
FIG. 2 is a diagram showing example details of an individual node, including a processing unit configured for processing multicast data packets.

FIG. 2 is a diagram showing example detail of the processing unit or circuitry 112 of the node 106B seen in FIG. 1. The processor 114 and memory 116 may be configured as a microprocessor and associated memory device(s), or may be contained within a custom device such as an ASIC. One or more applications 202 may operate on the node and may consume, process, generate or otherwise utilize data associated with one or more multicast data groups 204.

The state setup manager 118 is configured to receive one or more multicast requests 206 generated by the one or more applications 202 operating on the node. The state setup manager 118 may then generate a multicast report 208 containing a listing of one or more multicast groups desired by the applications 202 and indicated by the multicast requests 206. The state setup manager 118 may send the multicast report 208 upstream by local multicasting to parent(s) of the node 106B (e.g., node 106A, as seen in FIG. 1). Local multicasting may involve 1-hop multicasting, i.e., multicasting that does not include forwarding. Receipt of the multicast report 208 by the node 106A causes that node to set up a multicast forwarding state for the group(s) indicated by the multicast report 208. Thus, the upstream node 106A will forward multicast packets to the node 106B. In one example, the multicast report 208 sent upstream may be configured as a packet for transport, and in another example, it may include a field which indicates a preferred or required parent node to process and/or fulfill the multicast group information.

In one example, the state setup manager 118, or other device or portion of the node, receives a request 206 from a local application 202 running on the node to join a particular multicast group. The request may be added to the multicast report 208 generated by the state setup manager 118. The state setup manager 118 may then forward the multicast report 208 to one or more parent node(s) of the node. Upon processing by the parent node, the multicast report 208 will cause the parent node to assume a multicast forwarding state with respect to one or more multicast groups desired by the downstream node 106B.

While the state setup manager 118 may generate and send a multicast report 208 upstream, it may also receive a multicast report 210 sent upstream from downstream node(s). Such a received multicast report 210 indicates multicast groups desired by downstream nodes and/or applications running on such nodes. In response to receipt of multicast report(s) 210 from downstream node(s), the state setup manager 118 may adjust the multicast forwarding state manager 212 to indicate that there is need for multicast packet(s) and/or data 214 to be multicast (e.g., transmitted) downstream. Thus, the forwarding state manager 212 keeps track of forwarding states for a plurality of multicast groups. That is, the forwarding state manager 212 keeps track of whether multicast data associated with each multicast group should be forwarded. Such an adjustment to the multicast forwarding state manager 212 will indicate to the multicast group forwarding manager 120 to forward the appropriate multicast packets 214.

Thus, the multicast forwarding state manager 212 may be configured to keep track of whether specific multicast data should be forwarded downstream by multicast transmission. Thus, the multicast forwarding state manager 212 includes forwarding information for nodes downstream of node 106B, such as nodes 106D and 106N. The multicast forwarding state manager 212 may include addresses of multicast group(s) desired by downstream nodes and a forwarding flag, which may be set to YES when forwarding for the group is turn on, and may be set to NO otherwise. In one example, the multicast forwarding state manager 212 does not enumerate which specific child (downstream) nodes require particular multicast group(s) and/or data, because the multicast data packets are sent by local multicast, and not unicast, to each downstream child node.

The state setup manager 118 may be configured to periodically refresh the multicast report 208 to reflect multicast group data currently requested by local applications and downstream nodes. Accordingly, when the multicast report 208 is sent upstream, the correct multicast data will be sent downstream in response. The state setup manager 118 may refresh the multicast report 208 by merging data from multicast reports 210 newly received from downstream nodes into the multicast report 208. In one example, the state setup manager 118 may receive one or more multicast reports 210 from one or more downstream child nodes. Such multicast reports 210 indicate multicast groups currently desired by downstream nodes and/or their applications. The state setup manager 118 may maintain the multicast report 208 by adding current data from the received multicast report 210 and by removing outdated data. Similarly, the state setup manager 118 may maintain the multicast report 208 by adding current data from the multicast requests 206 of local applications and by removing outdated data. Thus, the multicast groups desired by both applications 202 running on the node and multicast groups desired by downstream nodes may be transmitted by the state setup manager 118, as indicated by the multicast report 208, to an upstream parent node. In the example of FIG. 1, the root node 106A is "upstream" and communicates with the network 104, while nodes 106B-N are downstream of node 106A. Accordingly, multicast group data 204 will be available for applications 202 and also for multicast to applications running on downstream nodes.

The state setup manager 118 may be configured to reduce network overhead by reducing transmission of the generated multicast report 208 to upstream parents if duplicate information sent by other child nodes of the upstream parents is overheard. Such information may be overheard, but it may not be certain that the information was reliably received by the intended parent node. In one example, the state setup manager 118 may maintain a "reports robustness" variable and/or value. Such a variable may be used to control how many overheard report transmissions, having the same information as the node's multicast report 208, should be heard before the state setup manager 118 cancels transmission of the multicast report 208.

In one example, the state setup manager 118 may perform an optimization designed to result in transmission of the multicast report 208 only a number of times believed likely to ensure receipt. In the example, at intervals, one or more nodes in the network may check to see how many transmissions of the same report information has been overheard over some period of time. This information may be used to create and maintain a variable indicating a "reports robustness" value, which may be compared to a variable or constant indicating a level of "desired received reports." The reports robustness value indicates a level of overheard transmissions of reports, while a "desired received reports" value or variable indicates a level of overheard reports that is appropriate and/or desired. Using this information and comparison, the state setup manager 118 may change a rate at which multicast reports 208 are transmitted. Operation of these variables may be understood with reference to three examples.

In a first example, there may be more reports overheard than desired, i.e., more reports heard than are needed to cause parent node(s) to forward the multicast data indicated by the reports, resulting in waste of bandwidth and network congestion. Note that the reports are "overheard," because they are transmissions from a child node to a parent node that are overheard by the node 106B, which may or may not be a child node of the parent. If there are X times "reports robustness" value of reports overheard by the state setup manager 118, then the state setup manager may reduce the reports robustness variable by a factor of Y (where X and Y may be proportional). Thus, if the node hears more than X times a "forwarding robustness" value of the multicast data packet, the node reduces an "overheard robustness" value by a factor of Y. The values X and Y may be real-valued factors based on a network within which the node is located In a second example, there may be fewer reports overheard than desired, i.e., fewer reports heard than are needed to cause parent node(s) to forward the multicast data indicated by the reports. This may result in nodes that do not receive desired multicast data, and may require additional transmissions of multicast report 208, to ensure that the node receives the desired multicast data, as indicated by the forwarding state 210. In this example, if a "reports robustness" value of overheard reports, having at least the groups indicated by the node's own multicast forwarding state 210 and listed in the multicast report 208, is less than a "desired received reports," then the state setup manager 118 may increase the "report robustness" variable and/or value by a factor of W. Thus, if the node hears less than Z times the forwarding robustness value of the multicast data packet, the node increases the overheard robustness value by a factor of W. The values of Z and W may be real-valued factors based on a network within which the node is located.

In a third example, the techniques of the second example may not sufficiently increase the level of overheard reports to the level of a "desired received reports" value. After one or more increases in the value of the "desired received reports" value, then the state setup manager 118 may contact an upstream node and direct it to update its multicast forwarding states and multicast report to include the multicast data desired by the state setup manager 118. Once updated, the upstream node will begin to forward the multicast group data desired by the state setup manager 118. In one example, the upstream node contacted may be a second parent of the node, ideally located in a second best path to the root, after the node's current parent.

The multicast group forwarding manager 120 may be configured to receive multicast data packets 214 from upstream nodes and, if indicated, forward the multicast data packets to downstream nodes. Thus, the node (e.g., node 106B) may be configured as a receiver of one or more multicast data groups, and as a forwarder for one or more (of possibly the same) multicast data groups. The multicast data groups for which the node is configured as a forwarder are indicated by the multicast forwarding state manager 212.

In one example, the multicast group forwarding manager 120 may receive a multicast data packet 214. The multicast data packet 214 may include data associated with one or more multicast groups. One or more of the applications 202 on the node may have indicated (e.g., by means of a multicast request 206) interest in receiving the one or more multicast groups. Additionally, applications on downstream nodes may also have indicated interest in receiving the multicast packet 214, such as by means of a multicast report 210. If applications on downstream nodes have requested data groups associated with the multicast packet 214, this information will be indicated by the multicast forwarding state manager 210. Accordingly, upon receipt of the multicast data packet 214, the multicast group forwarding manager 120 may consult the multicast forwarding state manager 212. If indicated by the multicast forwarding state manager 212, the multicast group forwarding manager 120 will forward the packet 214 downstream.

In order to increase the likelihood of reception by the appropriate downstream node(s), each multicast data packet (e.g., packet 214) indicated by the forwarding state manager 212 will be forwarded a number of times set by a variable or value, such as a "forwarding robustness" value. Forwarding robustness may be set initially at a value such as 2 or 3 times. However, because the network is a shared medium, nodes may overhear multicast packets not just from their parent in a routing tree, but also from other nearby nodes, which in a dense environment may result in reception of a very high number of copies of the multicast packet. To provide a balance between delivery reliability and overhead resulting from an excessive number of copies of each data packet being sent in the network, the multicast group forwarding manager 120 or other portion of the node may create and/or maintain an "overheard robustness" variable that dictates how many overheard data packet transmissions are enough to cancel out the node's own duplicate forwarding of a multicast data packet. Where indicated by the multicast forwarding state manager 212, the multicast group forwarding manager 120 will forward at least one copy of the multicast data packet 214. However, it will not forward additional copies of the multicast data packet 214 after it overhears the "overheard robustness" number of transmissions of the same packet by other nodes in the vicinity.

The "overheard robustness" variable can be adapted to the network environment of the node as indicated by the specific application. In one example, the following mechanism may be used where an excessive number of multicast packets are detected. If the multicast group forwarding manager 120 hears more than X times the "forwarding robustness" value of multicast data transmissions (e.g., multicast data 214) with the same identifying characteristic, it may reduce its "overheard robustness" variable by a factor of Y. In one example, the identifying characteristic may include a sequence number.

Sequence numbers may be used as a "tag" to packets, and thus provide a way to detect if the tagged packet has already been received at a particular node. In one example, each time a multicast packet enters an autonomous routing area, it is tagged with a unique sequence number and injected into the multicast forwarding tree. Each node along the multicast forwarding tree stores the sequence number(s) of multicast packet(s) that it has processed and/or forwarded. Thus, each time a node receives a multicast packet it may check to see if there is an entry in the forwarding state for the multicast group to which the packet is destined, or if the node is listening for the multicast group.

If the multicast group to which the packet is destined matches one of the multicast group addresses of the multicast forwarding states or the node is listening to this multicast group address, the node may perform one or more checks. For example the node may check the sequence number of the received packet against the locally stored sequence number (of the multicast packets that were previously processed and/or forwarded). If the sequence number matches the locally stored sequence number, the node drops/discards the packet (since the packet has already been processed). If the sequence number is lower than the locally stored sequence number, the node may drop the packet (since the packet may be out of date). If the sequence number is larger than the current sequence number, the node may update the locally stored sequence number with the number of the received packet, and process and/or forward the packet.

In an alternative example, the following mechanism may be used where too few multicast packets are detected. If the multicast group forwarding manager 120 hears less than Z times the "forwarding robustness" value of the multicast data packet 214, the node may increase the "overheard robustness" value by a factor of W. In these examples, the "forwarding robustness" value is initially a default number of multicast data packet retransmissions to be transmitted by the node, and the "overheard robustness" value is a threshold value of overheard multicast packets beyond which the "forwarding robustness" value is decreased, and wherein X, Y, Z and W are real-valued factors based on a network within which the node is located.

The multicast group forwarding manager 120 may also be configured to realize that the above example is insufficient, and that additional upstream nodes are required to transmit sufficient numbers of the multicast data packet. In this circumstance, the multicast group forwarding manager 120 may enlist other nodes to assist in retransmission of multicast data packet(s). In particular, the multicast group forwarding manager 120 may send directions to one or more upstream nodes to adjust their forwarding state manager to cause retransmission of the multicast data packet(s).

A query manager 122 is configured to act when forwarding of multicast data packets to a specific downstream node is no longer required, and a question arises whether other downstream nodes, which require forwarding of multicast data packets, remain. If such other downstream nodes remain, continued forwarding is indicated; if not, continued forwarding would only result in undesirable consumption of network bandwidth.

The query manager 122 may be configured to recognize circumstances that indicate a possible benefit of reducing and/or eliminating downstream forwarding of multicast packets and/or data. In particular, the query manager 122 may detect broken links downstream of the node and/or receipt of a leave packet 216 from a downstream node. The leave packet 216 may indicate one or more multicast groups to which the downstream node wishes to discontinue membership.

The query manager 122 may manage queries 218 sent downstream. The queries 218 may be sent after determining that at least one node no longer requires forwarding of multicast data. The query manager 122 may be configured to determine if other downstream nodes do require continued forwarding of the multicast data packets. Additionally, the query manager 122 may be configured to multicast queries in an efficient manner that balances the benefit of enough queries to determine if continued multicast of a group is required with the liability of over-transmission of queries, including network bandwidth usage.

The query manager 122 may be configured to send one or more queries 218 to downstream nodes, asking if they desire to receive data from one or more particular multicast groups. If the query manager 122 does not receive a response to the query, it will resend it after an interval. If no response is received, the multicast forwarding state manager 212 may expire the forwarding state for the multicast group.

The query manager 122 may also be configured to limit the number of queries sent using tools including probability. By limiting the number of queries sent, the number of reports sent in response from downstream nodes is also limited, thereby saving network bandwidth. In one example, the multicast forwarding state manager 212 may send one or more query packets according to a probability variable, e.g., "query probability," which may have an initial value of 50%. If the query manager 122 hears over "X" reports in response to a query, it may reduce the "query probability" variable by a factor of "Y" but no lower than a minimum defined probability value, such as "minimum query probability," where "X," "Y," and "minimum query probability" are defined by network conditions or other factors.

Example Methods

Figure 3:
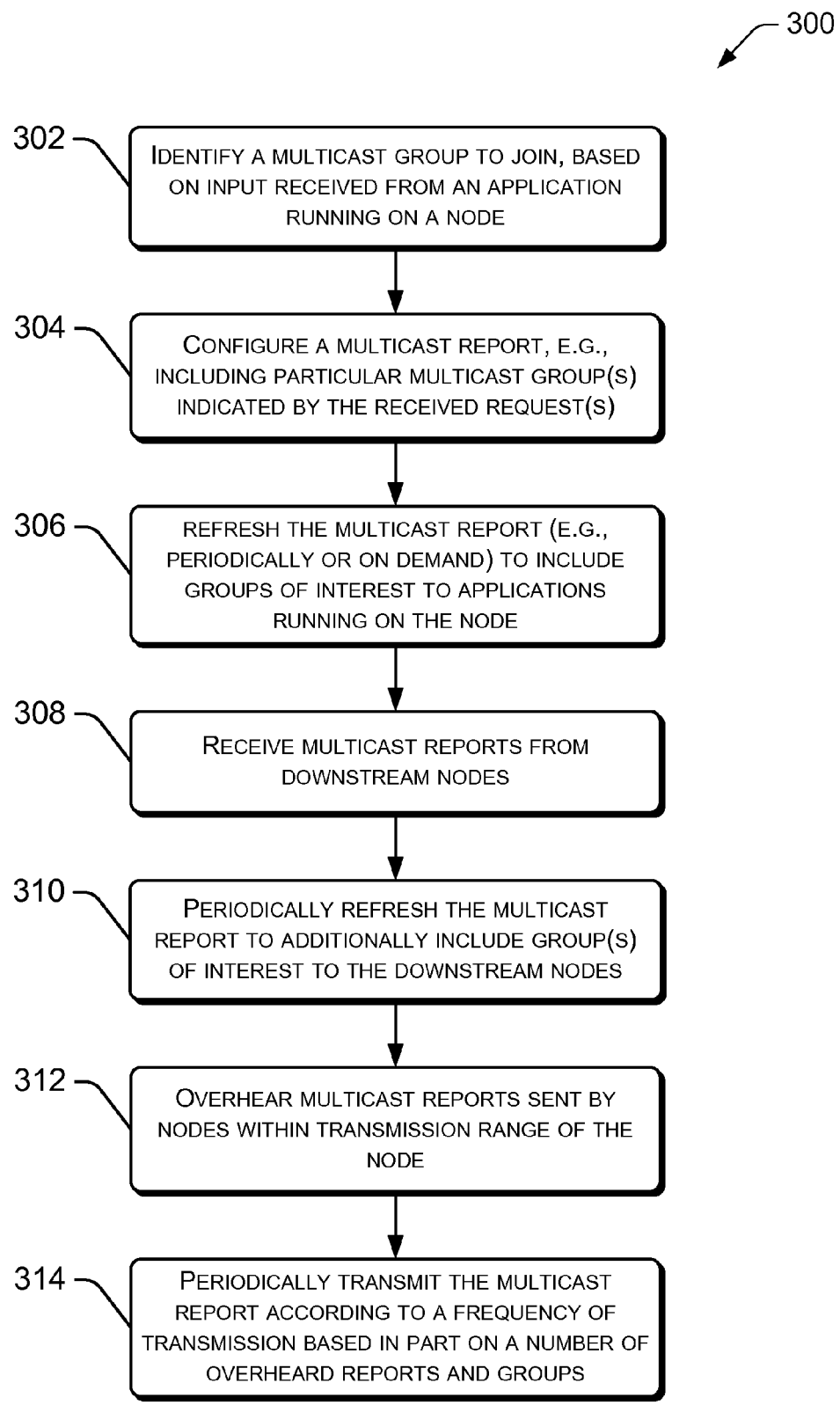
FIG. 3 is a flow diagram illustrating an example of report transmission suppression, particularly showing a method regulating a number and/or frequency of reports sent upstream to request downstream forwarding of one or more groups of multicast data.
Figure 4:
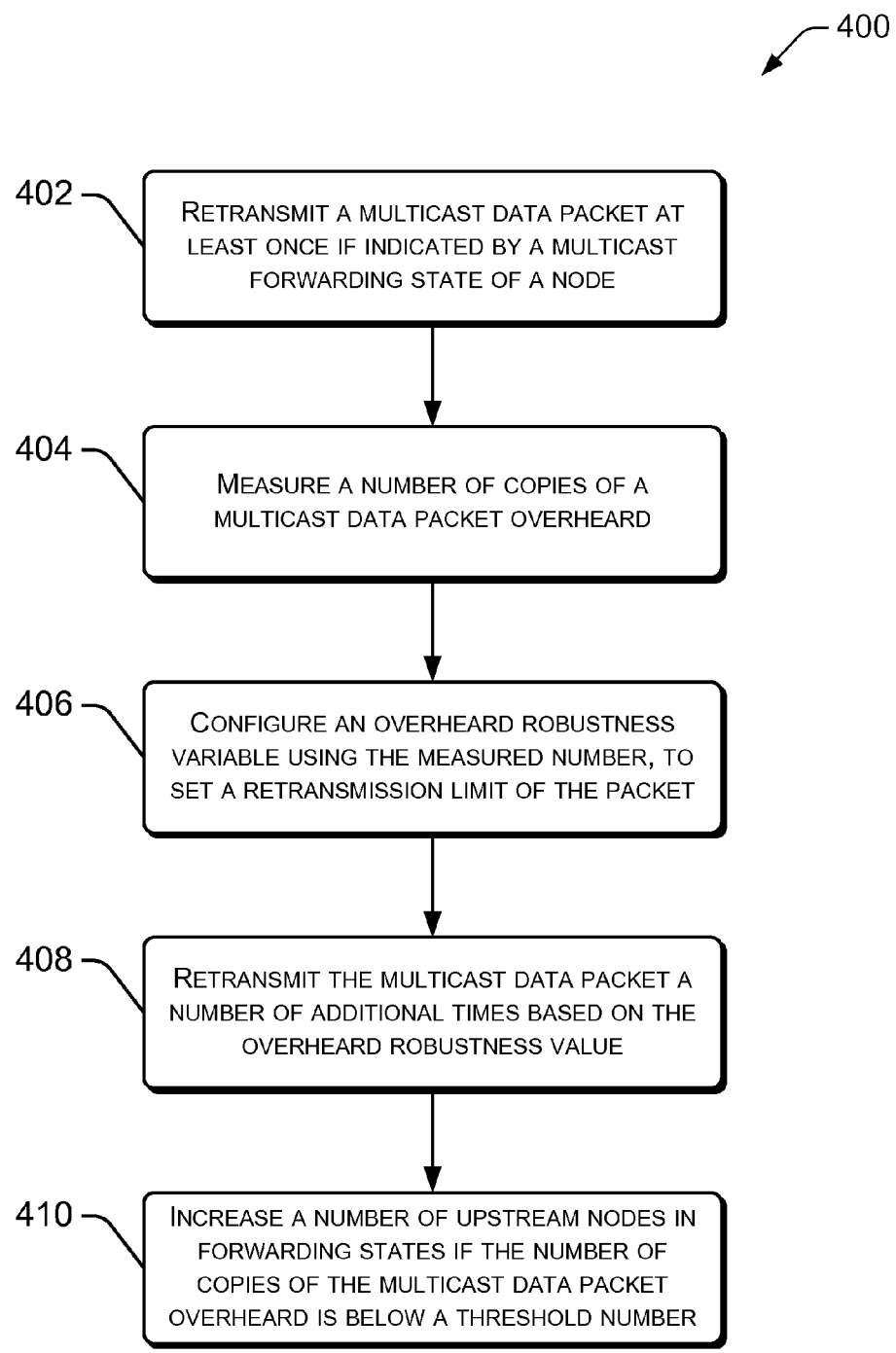
FIG. 4 is a flow diagram illustrating an example of multicast data forwarding, particularly showing a method by which downstream forwarding of multicast data packets may maximize a number of nodes receiving all desired multicast group packets and minimize the forwarding of multicast data packets that are unneeded.
Figure 5:
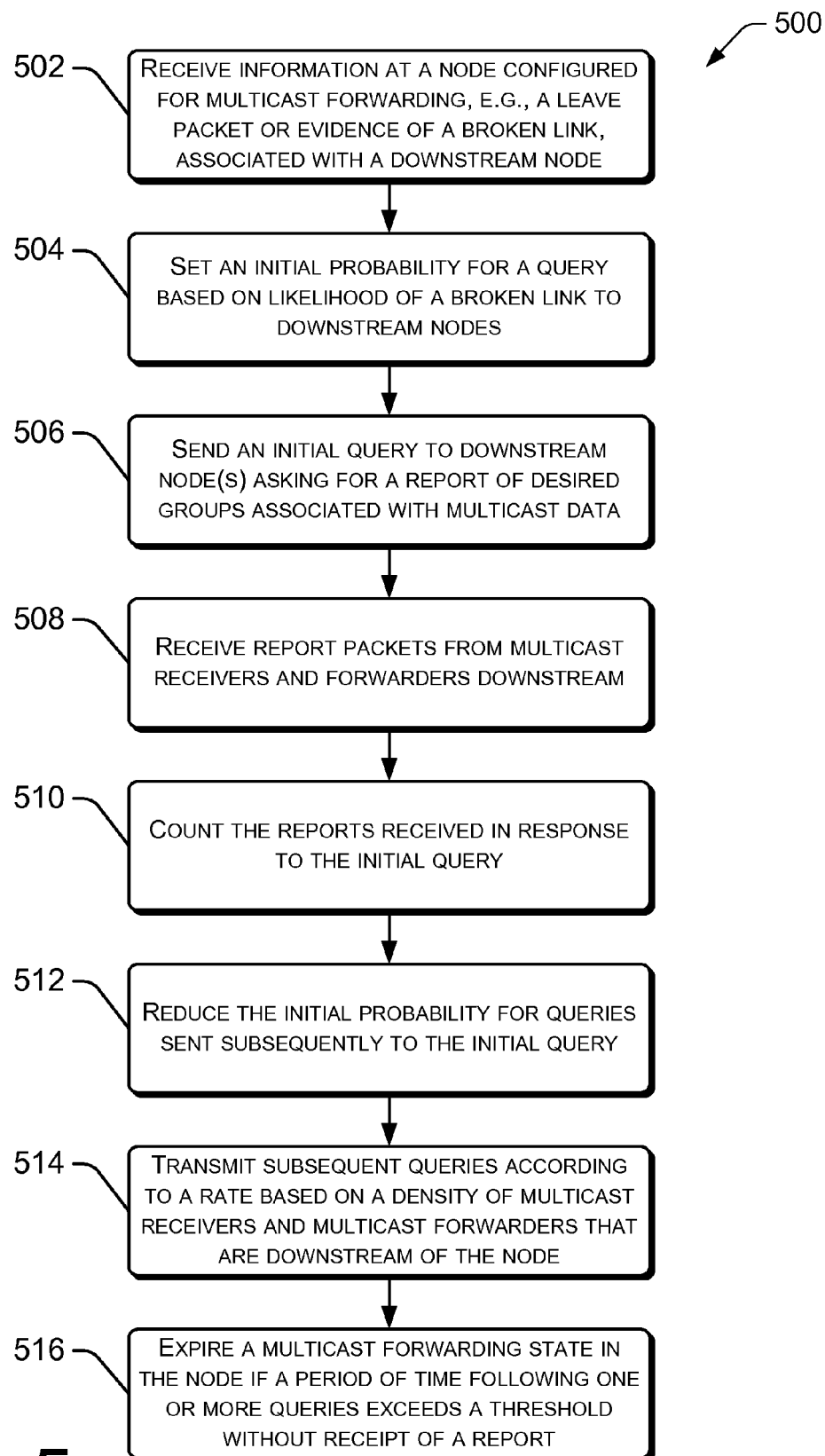
FIG. 5 is a flow diagram illustrating an example of query management, particularly showing a method regulating a rate of transmission of queries sent downstream in response to a broken link or node leaving a multicast group.

The example methods of FIGS. 3-5 may be implemented at least in part by the configurations of FIGS. 1 and 2. However, FIGS. 3-5 contain general applicability, and are not limited by other drawing figures and/or prior discussion. Each method described herein is illustrated as a collection of acts, blocks or operations in a logical flow graph, which represent a sequence of operations that can be implemented in hardware, software, or a combination thereof.

In the context of software, the operations represent computer-executable instructions stored on one or more computer-readable storage media 116 that, when executed by one or more processors 114, perform the recited operations. Such storage media 116, processors 114 and computer-readable instructions can be located within the processing circuitry 112 according to a desired design or implementation. The storage media 116 seen in FIGS. 1 and 2 is representative of storage media generally, both removable and non-removable, and of any technology. Thus, the recited operations represent actions, such as those described in FIGS. 3-5, and may be taken under control of one or more processors configured with executable instructions to perform actions indicated. Generally, computer-executable instructions include routines, programs, objects, components, data structures, and the like that perform particular functions or implement particular abstract data types. The order in which the operations are described is not intended to be construed as a limitation, and the described operations may be combined in different orders and/or in parallel to implement the method. The above discussion may apply to other methods described herein.

Additionally, for purposes herein, computer-readable media may include all or part of an application specific integrated circuit (ASIC) or other hardware device. Such a hardware device may be configured to include other functionality, including functions involving multicast within a wireless network. Accordingly, within such an integrated circuit, one or more processors are configured with executable instructions, which may be defined by logic, transistors or other components, or on-board memory.

Example Report Transmission Suppression

FIG. 3 is a flow diagram illustrating an example 300 of report transmission suppression. Reports, which indicate multicast data groups that a node would like to join (to receive and/or forward), may be sent upstream by nodes within a network. In response to the reports, upstream nodes may multicast data associated with the desired multicast data groups. A number and frequency of transmission of the reports may be regulated to ensure receipt of a report by upstream nodes, while limiting over-transmission of reports to minimize network bandwidth use.

At operation 302, one or more requests to join a particular multicast group may be received. In the context of example of FIG. 2, one or more requests 206, transmitted by application(s) 202 operating on the processing circuitry 112 of a node, may be received by the state setup manager 118.

At operation 304, a multicast report is configured. The multicast report may include the information on desired multicast groups obtained from one or more requests. In the context of example of FIG. 2, the multicast report 208 is generated by the state setup manager 118, based on one or more received multicast requests 206.

At operation 306, the multicast report is periodically refreshed, such as to include groups of interest to applications running on the node. In the context of the example of FIG. 2, the state setup manager 118 may periodically refresh the multicast report, based on additionally received multicast requests 206 or other information.

At operation 308, multicast reports from downstream nodes are received. Such reports indicate multicast groups desired by downstream nodes, which may have been requested by applications running on those nodes. In the context of the example of FIG. 2, the state setup manager 118 may receive multicast reports 210 from downstream nodes.

At operation 310, the multicast report may be periodically refreshed to include multicast group(s) of interest to applications running on the downstream nodes. In the context of the example of FIG. 2, the state setup manager 118 may use information from the received multicast report 210 to refresh the multicast report 208. Thus, reports from downstream nodes are merged into the multicast report 208 of the node, for transmission upstream.

At operation 312, multicast reports sent by nodes within transmission range of the node are overheard. The number of overheard reports, and whether they include requests to join the same or different multicast groups, may indicate whether the node should increase or decrease its own transmission of reports. In the context of the example of FIG. 2, received reports 210 may influence the state setup manager 118 to increase or decrease a number of reports 208 sent upstream.

At operation 314, the multicast reports are periodically transmitted upstream according to a frequency that is based in part on a frequency or a number of overheard reports, and the groups contained within the overheard reports. In the context of the example of FIG. 2, the state setup manager 118 may transmit the multicast report 208 upstream based in part on a number of overheard reports, and the groups contained within the overheard reports. For example, if the overheard reports are frequent, and reference at least the multicast groups included in report 208, then there is less need for the state setup manager 118 to transmit the report 208. Conversely, if the overheard reports are less frequently overheard, and/or do not contain all of the multicast groups contained in the report 208, the overheard reports do not lessen the need to transmit the report 208 upstream.

Example Multicast Data Forwarding

FIG. 4 is a flow diagram illustrating an example 400 of multicast data forwarding, particularly showing a method by which downstream forwarding of multicast data packets may maximize a number of nodes receiving all desired multicast group packets and minimize the forwarding of multicast data packets that are not needed by any node.

At operation 402, a multicast data packet may be retransmitted and/or forwarded at least once if indicated by a multicast forwarding state of a node. Note that a first transmission by the node may be considered a "retransmission," since it was transmitted to the node prior to the node's transmission. In the context of the example of FIG. 2, the multicast group forwarding manager 120 is configured to receive one or more multicast data packets 214, from one or more upstream nodes and retransmit the packet(s) to one or more downstream nodes. Although not required, the example provides that the multicast group forwarding manager 120 forward or retransmit the received multicast packet 214 at least once. The retransmission may include forwarding the multicast packet 214 if it contains information associated with any multicast group indicated by the multicast forwarding state manager 212. The multicast forwarding state manager 212 includes forwarding states based on multicast requests 206 received from applications 202 and multicast reports 210 received from downstream nodes, listing desired multicast groups.

At operation 404, a number of copies of a multicast data packet that are overheard is measured. In the context of the example of FIG. 2, the number of copies overheard may indicate the relative need of the multicast group forwarding manager 120 to retransmit multicast data packets. Where more copies are overheard, there is a lesser need to retransmit, since the downstream nodes to which the transmission would be intended are more likely to have already heard the transmission.

At operation 406, an "overheard robustness" variable or value is configured, based on network characteristics or other factors. The "overheard robustness" variable indicates a number of overheard multicast data packet transmissions that is sufficient to stop the node from retransmitting further copies of a multicast data packet. Thus, if a sufficient number of transmissions are overheard, the node stops its own transmissions and thereby reduces network load. In the example of FIG. 2, the "overheard robustness" value may be created and/or maintained by the multicast group forwarding manager 120.

At operation 408, the multicast data packet, originally retransmitted at operation 402, is retransmitted an additional number of times based at least in part on the "overheard robustness" value. In the context of the example of FIG. 2, the retransmission may be performed by the multicast group forwarding manager 120.

At operation 410, if the number of overheard multicast data packets is below a threshold number, it may be necessary to increase a number of upstream nodes configured to forward the multicast data packet(s). In the context of the example of FIG. 2, the multicast group forwarding manager 120 may realize that it needs help to transmit the multicast data packet(s), and it may enlist other nodes to assist. In particular, the multicast group forwarding manager 120 may send directions to upstream nodes to adjust their forwarding state managers to cause retransmission of the multicast data packet(s).

Example Query Management

FIG. 5 is a flow diagram illustrating an example 500 of query management. Queries may be sent to downstream nodes, such as following removal of a node as a downstream multicast data receiver, to see if multicast data is still desired by other downstream nodes. Query management determines a preferred number, frequency and/or duration of queries. In one example, retransmission to a downstream node may be cancelled at request of the downstream node (e.g., a "leave" packet, sent by the node to indicate the node's desire to leave the multicast group). In another example, a broken link to the downstream node may indicate the need to stop retransmission of multicast data packets to that node. However, before cancelling the retransmission of multicast data associated with multicast group(s), the node may send queries, to determine if other downstream nodes were depending on the multicast retransmissions. The queries may ask downstream nodes for "reports," which indicate desired multicast groups. A number and frequency of the queries transmitted by the node may be managed according to the example 500, to balance the expense of bandwidth devoted to queries with the need to discover downstream node(s) desiring membership to multicast group(s).

At operation 502, information is received at a node configured for multicast forwarding, such as a change in status of a downstream node. In one example, the information or status change may include a "leave" packet, sent by a downstream node, indicating that the downstream node is leaving the multicast group. In another example, the information may include evidence of a broken link, which prevents communication with the downstream node. In the context of the example of FIG. 2, the query manager 122 may monitor information, such as broken links and "leave" messages, indicating that multicast data should no longer be sent to a specific downstream node(s).

At operation 504, an initial probability is set for a query sent by the node. The probability may indicate likelihood of need of change in the status of the node regarding continued multicast forwarding. That is, the initial probability estimates the likelihood that the multicast forwarding state regarding a multicast group will be changed. The probability recognizes that "false positives" may indicate a broken link, when in fact the link is either operational or was only temporarily nonfunctional. Accordingly, an initial probability may be set, and may be based on a likelihood of a broken link to one or more downstream nodes.

At operation 506, an initial query is sent to downstream nodes, asking for a report of desired groups associated with multicast data. In the context of the example of FIG. 2, the query manager 122 may send a query 218, asking for downstream nodes to respond with a report (e.g., report 210) indicating multicast groups to which they desire membership. Referring to FIG. 1, nodes downstream of node 106B include 106D and 106N.

At operation 508, report packets are received from the downstream nodes, which may include nodes that are multicast receivers, multicast forwarders and both. In the context of the example of FIG. 2, the query manager 122 may receive one or more reports (e.g., reports 210).

At operation 510, the reports received in response to the query are counted. The count of the received reports may be used to refine the probability associated with the query, and may be used as part of the input required to determine if multicast data retransmission should be continued.

At operation 512, the initial probability associated with queries sent downstream is reduced for subsequently transmitted queries. In one example, the initial probability set at operation 504 may be reduced for queries sent subsequently to the query of operation 506. Additionally, the reduction in probability may be based on a number of the counted reports. The reduction may be larger if a larger number of reports is counted, or smaller if a smaller number of reports is counted. In another example, the probability applied to queries sent subsequently to the query of operation 506 may be reduced by a factor, but not below a minimum level.

At operation 514, subsequent queries are transmitted according to a rate based on a density of multicast receivers and multicast forwarders that are downstream of the node. In the context of the example of FIG. 2, the query manager 122 may transmit queries to downstream nodes based on the rate based on a density of multicast receivers and multicast forwarders that are downstream of the node, which may be determined or estimated based in part on the count of the received reports.

At operation 516, a multicast forwarding state in the node may expire if a period of time following one or more queries exceeds a threshold period of time without receipt of a report from downstream nodes. Failure to receive a report may indicate that downstream nodes do not exist, or do not require multicast data and/or membership to multicast groups. In the context of the example of FIG. 2, the query manager 122 may expire the forwarding state of any downstream nodes with notice to the multicast forwarding state manager 212.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method of operating a node, comprising:
under control of circuitry of the node configured to execute the method:
identifying a particular multicast group to join, based on input from an application running on the node;
configuring a multicast report, the multicast report including the particular multicast group indicated by the input;
periodically refreshing the multicast report to include groups of interest to applications running on the node;
overhearing multicast reports sent by nodes within transmission range of the node; and
periodically transmitting the multicast reports according to a frequency of transmission that is based on a number of the overheard multicast reports that request to join multicast groups indicated by the periodically transmitted multicast report.

2. The method of claim 1, additionally comprising:
receiving multicast reports from downstream nodes; and
periodically refreshing the multicast report to additionally include groups of interest to the downstream nodes as indicated by the received multicast reports.

3. The method of claim 1, wherein periodically transmitting the multicast report comprises:
transmitting the multicast report to a parent of the node based on a frequency of the overheard multicast reports.

4. The method of claim 1, additionally comprising:
measuring a number of copies of a multicast data packet overheard, wherein the multicast data packet was indicated in the periodically transmitted multicast report;
retransmitting the multicast data packet at least once if indicated by a multicast forwarding state of the node, the forwarding state indicating need to forward multicast data, in response to retransmission of multicast data packets; and
retransmitting the multicast data packet a number of additional times based on the number of copies of the multicast data packet overheard.

5. The method of claim 1, additionally comprising:
recording unique sequence numbers of multicast data packets, the multicast data packets indicated in the periodically transmitted multicast report;
decreasing a number of retransmissions of multicast data packets that were identified by the recording as being received above a first threshold number of times;
increasing a number of retransmissions of multicast data packets that were identified by the recording as being received below a second threshold number of times; and
increasing a number of forwarding states among upstream nodes, the forwarding states indicating need to forward multicast data, in response to retransmission of multicast data packets, identified by the recording, received below a third threshold number of times.

6. The method of claim 1, additionally comprising:
recognizing a change in a status of a downstream node, wherein the downstream node is configured as a multicast receiver downstream of the node, and wherein the downstream node contributed to the multicast report;
sending a query to other downstream nodes, in response to the recognized change, asking for a report of desired multicast data groups; and
sending subsequent queries according to a probability that is reduced based on a number of reports heard in response to the query sent and in response to subsequent queries sent.

7. The method of claim 1, additionally comprising:
receiving information, including a leave packet, indicating a node has left a multicast group, or evidence of a broken link, associated with a downstream node that has contributed to the multicast report;
sending a query to other downstream nodes in response to the received information asking for a report of desired multicast data groups;

transmitting subsequent queries at a rate based on a density of multicast receivers and multicast forwarders that are downstream from the node and based on a period of time following the query or the subsequent queries without receipt of a report; and expiring a multicast forwarding state of the node if the period of time exceeds a threshold.

8. Circuitry for operating a node, the circuitry configured to perform acts comprising:

measuring a number of copies of a multicast data packet overheard during a period of time;

retransmitting the multicast data packet at least once if indicated by a multicast forwarding state of the node, the forwarding state indicating need to forward multicast data; and retransmitting the multicast data packet a number of additional times based on the number of copies of the multicast data packet overheard during the period of time.

9. The circuitry of claim 8, the acts additionally comprising:

increasing a number of upstream nodes in forwarding states, the forwarding states indicating need to forward multicast data, if the number of copies of the multicast data packet overheard is below a threshold number.

10. The circuitry of claim 8, wherein retransmitting the data multicast packet the number of additional times based on the number of copies of the multicast data packet overheard comprises:

if the node hears more than X times a forwarding robustness value of the multicast data packet, the node reduces an overheard robustness value by a factor of Y; and if the node hears less than Z times the forwarding robustness value of the multicast data packet, the node increases the overheard robustness value by a factor of W;

wherein the forwarding robustness value is a number of multicast data packet retransmissions to be transmitted by the node, wherein the overheard robustness value is a threshold value of overheard multicast packets beyond which the forwarding robustness value is decreased, and wherein X, Y, Z and W are real valued factors based on a network within which the node is located.

11. The circuitry of claim 8, the acts additionally comprising:

configuring a multicast report, the multicast report including at least one group for which data within the multicast data packet is desired;

periodically refreshing the report to include all groups of interest to applications running on the node; and periodically transmitting the report upstream according to a frequency based on a number of overheard reports during a period of time and based on groups included in the overheard reports.

12. The circuitry of claim 8, the acts additionally comprising:

configuring a multicast report, the multicast report including at least one group for which data is desired by an application running on the node and for which data is included in the multicast data packet;

overhearing reports sent by other nodes, the overheard reports requesting membership in the group for which data is desired by the application running on the node; and transmitting the multicast report to a parent node of the node, the transmitting based on a frequency of the overheard reports and based on groups included in the overheard reports.

13. The circuitry of claim 8, the acts additionally comprising:

recognizing a change in a status of a node configured as a multicast receiver downstream of the node and configured to receive the multicast packet;

sending a query to downstream nodes in response to the recognized change in status, the query asking for a report of desired multicast data groups; and sending subsequent queries if indicated by a probability that the change in the status of the node indicates a need to discontinue multicast forwarding, the probability being reduced in response to a number of reports heard in response to the query sent and in response to subsequent queries sent.

14. The circuitry of claim 8, the acts additionally comprising:

receiving information, including a leave packet or evidence of a broken link, associated with a downstream node, the downstream node configured to receive the multicast packet;

sending a query to other downstream nodes in response to the received information asking for a report of desired groups associated with multicast data;

transmitting subsequent queries according to a rate based on a density of multicast receivers and multicast forwarders that are downstream from the node; and expiring a multicast forwarding state of the node if a period of time following the query or the subsequent queries without receipt of a report exceeds a threshold.

15. One or more non-transitory computer-readable media storing computer-executable instructions that, when executed, cause one or more processors to perform acts comprising:

receiving information at a node including a leave packet or evidence of a broken link associated with a node downstream of the node;

sending a query to other nodes downstream of the node, the query sent in response to the received information and asking for a report of desired groups associated with multicast data;

transmitting subsequent queries according to a rate based on a density of multicast receivers and multicast forwarders that are downstream from the node; and expiring the multicast forwarding state in the node if a period of time following the query, or the subsequent queries, exceeds a threshold without receipt of a report, the expiring of the forwarding state indicating that there is no need to forward multicast data for a multicast group.

16. The one or more non-transitory computer-readable media of claim 15, wherein sending the query to the node downstream of the node comprises:

sending the query based on an initial probability that a link to nodes downstream of the node is broken;

counting reports sent in response to the sent query; and reducing the initial probability for application to queries sent subsequent to the sent query, wherein an amount of a reduction in probability is based on a number of the counted reports.

17. The one or more non-transitory computer-readable media of claim 15, wherein sending the query to the node downstream of the node comprises:

sending the query based on an initial probability;

counting reports sent in response to the sent query; and reducing the initial probability of queries sent subsequently to the sent query, wherein the reports counted are associated with a factor by which the initial probability is reduced, and wherein the factor does not reduce the initial probability below a minimum level.

18. The one or more non-transitory computer-readable media of claim 15, additionally including instructions to cause one or more processors to perform acts comprising:
configuring a multicast report, the multicast report including at least one group for which data is desired within a multicast data packet;
periodically refreshing the report to include all multicast groups of interest to applications running on the node; and
periodically transmitting the report upstream at a frequency based on a number of overheard reports during a period of time and based on groups included in the overheard reports.

19. The one or more non-transitory computer-readable media of claim 15, additionally including instructions to cause one or more processors to perform acts comprising:
configuring a multicast report, the multicast report including at least one group for which data is desired by an application running on the node and at least one group for which data is desired by at least one downstream node;
overhearing reports sent by other nodes, the overheard reports requesting membership in the group for which data is desired by the application running on the node and requesting membership in the group for which data is desired by the at least one downstream node; and
transmitting the multicast report to a parent node of the node, the transmitting based on a frequency of the overheard reports and based on groups included in the overheard reports.

20. The one or more non-transitory computer-readable media of claim 15, additionally including instructions to cause one or more processors to perform acts comprising:
measuring a number of copies of a multicast data packet that are overheard, the multicast data packet being indicated by the multicast report;
retransmitting the multicast data packet at least once if indicated by a multicast forwarding state of the node, the retransmitting sending the multicast data packet at least to the node downstream of the node;
retransmitting the multicast data packet a number of additional times based on the number of copies of the multicast data packet overheard; and
increasing a number of upstream nodes in forwarding states if the number of copies of the multicast data packet overheard is below a threshold number, the increased number of forwarding states indicating increased numbers of nodes forwarding multicast data groups.

* * * * *